US010733608B2

(12) United States Patent
Guo et al.

(10) Patent No.: US 10,733,608 B2
(45) Date of Patent: Aug. 4, 2020

(54) DETECTION OF FRAUDULENT USE OF CARDS AND MOBILE DEVICE-BASED PAYMENTS

(71) Applicant: International Business Machines Corporation, Armonk, NY (US)

(72) Inventors: Shang Q. Guo, Cortlandt Manor, NY (US); Jonathan Lenchner, North Salem, NY (US); Maharaj Mukherjee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 14/939,653

(22) Filed: Nov. 12, 2015

(65) Prior Publication Data

US 2017/0140383 A1 May 18, 2017

(51) Int. Cl.
*G06Q 20/40* (2012.01)
*G06Q 20/32* (2012.01)
*G06Q 20/34* (2012.01)

(52) U.S. Cl.
CPC ..... *G06Q 20/4016* (2013.01); *G06Q 20/3224* (2013.01); *G06Q 20/3226* (2013.01); *G06Q 20/34* (2013.01)

(58) Field of Classification Search
CPC ....... G06Q 40/025; G06Q 40/00; G06Q 20/10
(Continued)

(56) References Cited

U.S. PATENT DOCUMENTS 7,251,624 B1  7/2007 Lee et al.
7,421,466 B2 * 9/2008 Haines .................. H04W 99/00
                                                   340/990
(Continued)

FOREIGN PATENT DOCUMENTS

CN          103455912 A     12/2013

OTHER PUBLICATIONS

Measured Near Field Communication Antenna for Fintech Innovation. Wen-Cheng Lai. The 7th IEEE Internation Symposium on Next-Generation Electronics. 2018. (Year: 2018).*

(Continued)

*Primary Examiner* — Alexander G Kalinowski
*Assistant Examiner* — John O Preston
(74) *Attorney, Agent, or Firm* — Anthony Curro; Ryan, Mason & Lewis, LLP

(57) ABSTRACT

A method for detecting fraudulent payment activity comprises designating one or more objects as typically being in a proximity of a payment mechanism when the payment mechanism is used in a payment transaction, verifying, when attempting to use the payment mechanism for a given payment transaction, whether the designated one or more objects are in the proximity of the payment mechanism, wherein the verifying is based on an electronic communication from at least one of the payment mechanism and the designated one or more objects, establishing whether a threshold number of the designated one or more objects are in the proximity of the payment mechanism, permitting processing of the given payment transaction if the threshold number of the designated one or more objects are in the proximity of the payment mechanism, and preventing processing of the given payment transaction if less than the threshold number of the designated one or more objects are in the proximity of the payment mechanism.

20 Claims, 5 Drawing Sheets

(58) Field of Classification Search
USPC .......................................................... 705/35
See application file for complete search history.

(56) References Cited

U.S. PATENT DOCUMENTS

| | | |
|---|---|---|
| 7,480,631 B1 | 1/2009 | Merced et al. |
| 8,739,278 B2 | 5/2014 | Varghese |
| 9,019,080 B2 | 4/2015 | Centanni, Jr. et al. |
| 2009/0248581 A1 | 10/2009 | Brown |
| 2012/0209773 A1* | 8/2012 | Ranganathan ......... G06Q 20/40 705/44 |
| 2014/0229377 A1 | 8/2014 | Vakklaganti |

OTHER PUBLICATIONS

Mobile Payment Fraud: A practical view on the Technical Architecture and Starting Points for Forensic Analysis of new attack scenarios. Christof Kier, Gerald Madlmayr, et al. 2015 Ninth International Conference on IT Security Incident Management & IT Forensics. 2015 (Year: 2015).*

An empiric path towards fraud detection and protection for NFC-enabled mobile payment system. Pinki Prakash Vishwakarma, et al. Telkomnika, vol. 17, No. 5, Oct. 2019, pp. 2313-2320 (Year: 2019).*

* cited by examiner

DETECTION OF FRAUDULENT USE OF CARDS AND MOBILE DEVICE-BASED PAYMENTS

TECHNICAL FIELD

The field generally relates to detecting fraudulent payment activity and, in particular, to detecting fraudulent payment activity based on a proximity of objects to the payment mechanism.

BACKGROUND

Some known credit or bank account payment fraud prevention methodologies depend on the location of the use of a payment card, such as a credit or debit card. For example, if a person is traveling and did not inform his or her bank prior to the travel, a fraud prevention department of the bank may block the usage of the payment card when they detect use of the payment card in a location that is not a understood as being a regular location of the account holder. This can greatly inconvenience a traveler. Such a situation may be even more aggravating if use of the payment card is blocked in a foreign country where the account holder may not speak the native tongue and/or has difficulty communicating. This known method of fraud prevention can be overly conservative and inconvenient and/or embarrassing for account holders attempting to use their cards. In addition, the known method may prevent the legitimate use of a payment card in a dire or emergency situation.

On the other hand, this method of fraud prevention may not work when account holders' payment cards are stolen or compromised while the account holders are in their normal home domain. In this case even if the card is used fraudulently, the fraudulent use may not trigger any reaction from the issuing bank since the card is being used in the account holders' home country or area and/or in at a location where the account holder is typically present.

SUMMARY

According to an exemplary embodiment of the present invention, a method for detecting fraudulent payment activity comprises designating one or more objects as typically being in a proximity of a payment mechanism when the payment mechanism is used in a payment transaction, verifying, when attempting to use the payment mechanism for a given payment transaction, whether the designated one or more objects are in the proximity of the payment mechanism, wherein the verifying is based on an electronic communication from at least one of the payment mechanism and the designated one or more objects, establishing whether a threshold number of the designated one or more objects are in the proximity of the payment mechanism, permitting processing of the given payment transaction if the threshold number of the designated one or more objects are in the proximity of the payment mechanism, and preventing processing of the given payment transaction if less than the threshold number of the designated one or more objects are in the proximity of the payment mechanism.

According to an exemplary embodiment of the present invention, a system for detecting fraudulent payment activity comprises a memory and at least one processor coupled to the memory, wherein the at least one processor is configured to designate one or more objects as typically being in a proximity of the payment mechanism when the payment mechanism is used in a payment transaction, verify, when attempting to use the payment mechanism for a given payment transaction, whether the designated one or more objects are in the proximity of the payment mechanism, wherein the verifying is based on an electronic communication from at least one of the payment mechanism and the designated one or more objects, establish whether a threshold number of the designated one or more objects are in the proximity of the payment mechanism, permit the given payment transaction to be processed if the threshold number of the designated one or more objects are in the proximity of the payment mechanism, and prevent the given payment transaction from being processed if less than the threshold number of the designated one or more objects are in the proximity of the payment mechanism. The payment mechanism can comprise the memory and the at least one processor.

According to an exemplary embodiment of the present invention, a computer program product for detecting fraudulent payment activity comprises a computer readable storage medium having program instructions embodied therewith, the program instructions executable by a processor to cause the processor to perform a method comprising designating one or more objects as typically being in a proximity of a payment mechanism when the payment mechanism is used in a payment transaction, verifying, when attempting to use the payment mechanism for a given payment transaction, whether the one or more objects are in the proximity of the payment mechanism, wherein the verifying is based on an electronic communication from at least one of the payment mechanism and the designated one or more objects, establishing whether a threshold number of the designated one or more objects are in the proximity of the payment mechanism, permitting processing of the given payment transaction if the threshold number of the one or more objects are in the proximity of the payment mechanism, and preventing the given payment transaction if less than the threshold number of the one or more objects are in the proximity of the payment mechanism.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION

Exemplary embodiments of the invention will now be discussed in further detail with regard to detecting fraudulent payment activity based on a proximity of objects to the payment mechanism. This invention may, however, be embodied in many different forms and should not be construed as limited to the embodiments set forth herein.

In accordance with an embodiment of the present invention, payment activity includes payment for goods and/or services via a payment card, such as, for example, a credit card or debit card, or any other cards capable of being used for payment at a physical or online provider of the goods and/or services. Payment activity also includes payment for goods and/or services via a mobile device, such as, but not limited to, for example, a smart phone, watch or tablet that can be used instead of a payment card to make a payment (e.g., APPLE PAY, M-PESA). As used herein, a "payment mechanism" can refer to a payment card or a mobile device.

A method for detecting fraudulent payment activity, in accordance with an embodiment of the present invention, tracks and ascertains the vicinity of other objects that a user typically carries on his/her person along with the payment mechanism for which fraud may be detected. Such objects may be, for example, but are not limited to, additional payment cards, and mobile devices, including, for example, smart phones, wearable computing devices, such as smart watches, smart glasses, smart monitoring wrist bands, e-readers, and other similar user devices and accessories. These devices are or can be equipped with certain communication capabilities including, but not limited to, BLUETOOTH, WiFi, radio frequency identification (RFID), IEEE 802.11 and/or near field communication (NFC) capabilities.

Figure 1:
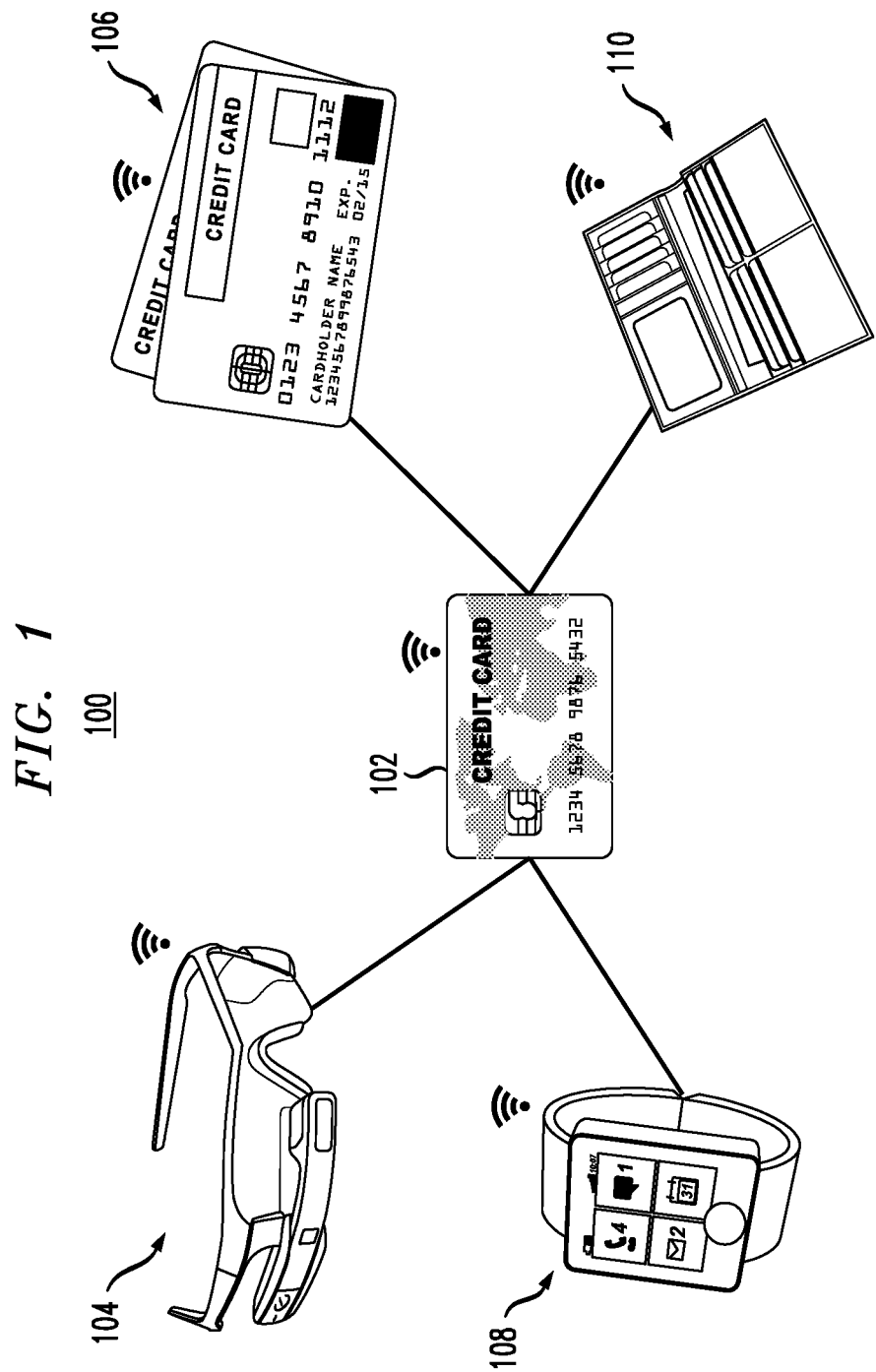
FIG. 1 is a diagram illustrating an example of devices together with a payment mechanism that may form an ad hoc network, in accordance with an embodiment of the present invention.

Using one or more of such communication capabilities, the objects that a user typically carries on his/her person with the payment mechanism can form an ad hoc network together with the payment mechanism. FIG. 1 is diagram illustrating an example of devices together with a payment mechanism that may form an ad hoc network, in accordance with an embodiment of the present invention.

As used herein, an "ad hoc network" or "wireless ad hoc network (WANET)" can refer to a decentralized type of wireless network that does not rely on a pre-existing infrastructure, such as routers or access points in managed (e.g., infrastructure) wireless networks. As used herein, an ad hoc network or WANET can be a self-configuring, dynamic network that lacks infrastructure setup and administration, enabling devices to independently create and join the network.

As used herein, "typically" can refer to, for example, characteristically, normally, regularly, usually, and/or habitually, etc. and as described in further detail herein, it can be specified by a user or learned which items are typically carried by a user/account holder with the payment mechanism, or are typically in the proximity of the payment mechanism when performing a payment transaction. According to an embodiment, typically can refer to a majority of the time, such as for example, greater than 50% of the time. In addition, typically may also be defined in the context of a given situation, for example, those items typically carried by a user/account holder when exercising, on the weekend, at work, etc.

Referring to FIG. 1, an ad hoc network 100 comprises nodes including a payment mechanism 102, and objects 104, 106, 108 and 110. The objects 104-110 can be objects that a user typically carries on his/her person. As shown in FIG. 1, the payment mechanism 102 is a payment card, but can be, for example, a mobile device as explained hereinabove. As shown in FIG. 1, the objects 104-110 include smart glasses 104, other payment cards 106, a smart watch 108 and a wallet 110. It is to be understood that the embodiments of the present invention are not limited to the payment mechanism 102 and objects 104-110 shown in FIG. 1, and that other arrangements of devices may comprise an ad hoc network 100.

In accordance with an embodiment of the present invention, each of the nodes of an ad-hoc network, for example, nodes 102-110 of the network 100, includes requisite hardware and, if necessary, a power source for establishing active automatic wireless communication with other nodes of the ad hoc network and for running software for recognizing other nodes in the network. In addition, each of the nodes of an ad-hoc network, for example, nodes 102-110 of the network 100, or at the very least, the payment mechanism (e.g., payment mechanism 102), includes requisite hardware and a power source for running software to establish which objects are to be considered the objects that a user typically carries on his/her person along with the payment mechanism, and recognizing when the payment mechanism 102 is separated from those objects, giving rise to a potential fraudulent situation. In accordance with an embodiment of the present invention, when a situation arises where the payment mechanism 102 is used and it is not within a detectable range any of the objects a user typically carries on his/her person, or is within range of one or a plurality, but not all of those objects, the payment mechanism 102 can recognize the separation from all or some of the objects, and deactivate itself. Alternatively, the payment mechanism 102 can require successful completion of an identity challenge before allowing a payment transaction to be completed. An identity challenge can include, but is not limited to, entering a zip code, or alerting a clerk at a merchant to verify a matching signature form the purchaser with that on a payment card, and/or require a picture identification from the purchaser.

According to an embodiment of the present invention, varying degrees of an identity challenge can be implemented based on how much concern there may be that a fraudulent transaction may be taking place. For example, if the payment mechanism encounters a full range of the objects that a user typically carries on his/her person along with the payment mechanism in an ad hoc network, the payment mechanism can allow the payment transaction to be processed without requiring any verification of identity. In another scenario, if there is a slight suspicion of fraudulent activity because one or two of the payment mechanism's usual neighbors are not present, the payment mechanism may require, for example, a zip code prior to completing a transaction. However, if many or all of the usual neighbors of a payment mechanism are not present, the payment mechanism may require, for example, signature and/or picture identification verification prior to allowing a transaction to be completed, or deny the transaction outright. In another embodiment, when a payment mechanism establishes communication with a device that has not been determined to be one of the objects that a user typically carries on his/her person along with the payment mechanism, the payment mechanism may conclude suspected fraudulent activity upon attempting to process a payment and proceed by deactivating itself and/or requiring an identity challenge.

In another variation, the proximity to objects that are in natural proximity of the payment mechanism, such as the credit or debit card of a mobile payment device, can be made asymmetrical by assigning certain weighted priorities. For example, proximity to other credit cards that a user carries along with a given credit card are assigned lower priorities than wearable objects, such as a smart phone, smart watch or smart glasses. This would help prevent fraudulent use of the given credit card when a whole wallet or a purse is stolen along with all the credit cards. In this scenario, it is unlikely that a pair of smart glasses and/or watch, for example, are stolen along with the wallet. As will be explained later, these priority based weights can be assigned by users themselves or can be self-learned by the system based on historical proximities.

In accordance with an embodiment of the present invention, each of the nodes of an ad-hoc network, for example, nodes 102-110 of the network 100, or at the very least, the payment mechanism (e.g., payment mechanism 102), includes requisite hardware and a power source for running software to learn that some nodes associated with a payment mechanism in an ad hoc network may be expected during a certain time period, such as for example, working hours, when participating in physical activity, on certain days, the weekend, etc., and/or to learn that some nodes associated with a payment mechanism in an ad hoc network may be expected at a particular location. For example, a user/account holder may have decided to go for a jog to the corner shop to purchase something, but so as not to have to carry a full wallet in his/her running shorts, decides to carry a single credit card. In this scenario when the payment mechanism is separated from its usual neighbors, in order to avoid the inconvenience of a false fraud determination, the payment mechanism may be programmed to require identity verification rather than rejecting the purchase altogether, and/or may learn that the user/account holder habitually jogs to the corner store with just the payment mechanism at particular times and/or on certain days.

Hardware and power sources can include, but are not limited to, processors, for example, specialized processors, memories, transmitters, receivers, and batteries, such as, for example, lithium batteries.

Figure 2:
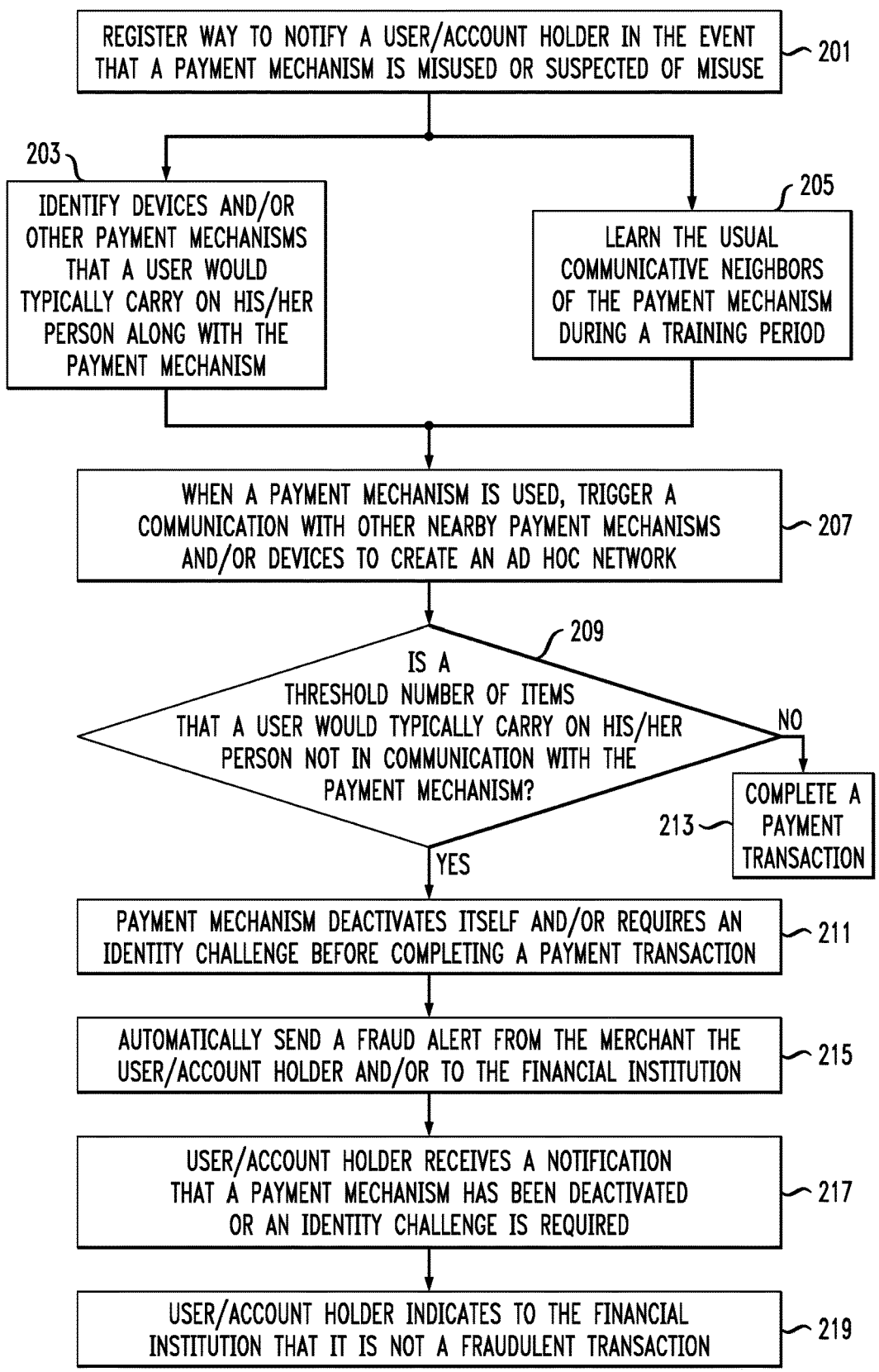
FIG. 2 is a flow diagram of a process for detecting fraudulent payment activity, according to an exemplary embodiment of the invention.

FIG. 2 is a flow diagram of a process for detecting fraudulent payment activity, according to an exemplary embodiment of the invention. Referring to FIG. 2, the process 200 includes, at block 201, registering, with a financial institution or some controlling entity for the payment mechanism, a way to notify a user/account holder in the event that a payment mechanism is misused or suspected of misuse. The ways to notify can include, for example, a cell phone number, email address or other appropriate means to contact a user.

At block 203, a user can identify, for the financial institution, devices and/or other payment mechanisms that a user would typically carry on his/her person along with the payment mechanism. For example, a user can specify those items which must be recognized as neighbors of the payment mechanism, and/or which items are likely to be neighbors of the payment mechanism. In accordance with an embodiment of the present invention, a user can assign weights to the different objects that may be part of the ad hoc network, indicating how important it is to have a particular item present when a payment transaction is taking place. For example, given the possibility that an entire wallet including the payment mechanism and other forms of payment may be stolen or lost, a user may assign relatively lower weights to the items in the wallet since potential fraudulent users may be more likely to have those items in their possession if they have stolen or found the entire wallet. Conversely, a user may assign a relatively higher weight to items such as, for example, mobile phones, smart glasses and/or smart watches, which are more likely to be in the user's possession if the payment mechanism and wallet are lost or stolen. Therefore, if it is determined that an item with a higher weight is not part of an ad hoc network when a transaction is taking place, the payment mechanism would be more likely to deactivate or require successful completion of identity challenges before allowing a payment transaction to be completed. According to an embodiment of the present invention, the user-specified neighboring items and/or weights can be loaded onto the payment mechanism by the financial institution, or by the user using an appropriate mobile and/or computer software application configured to transmit such information to the payment mechanism. According to an embodiment, a user can specify certain groupings of neighboring items that are used at particular times and at particular locations.

Referring to block 205, the usual communicative neighbors of the payment mechanism can also be learned by the payment mechanism during a training period. In this case, the payment mechanism is equipped with software including a learning algorithm so that the payment mechanism can identify those items that a user would typically carry on his/her person along with the payment mechanism. According to an embodiment, the payment mechanism may be able to identify certain groupings of neighboring items that are used at particular times and at particular locations. Such specification by a user and/or identification by the payment mechanism of certain groupings of neighboring items that are used at particular times and at particular locations can help to avoid false fraud alerts in unconventional situations, such as those encountered by the jogger described above.

In a situation where the communicative neighboring items are learned, the payment mechanism can be programmed to generate relatively few fraudulent use alerts during a training period given an uncertainty about those items that a user would typically carry on his/her person along with the payment mechanism. This can be done to reduce incidences of false fraudulent use alerts and/or unwanted deactivations of the payment mechanism during the training period. A user may also understand that there may be an increased chance of a misuse of a payment mechanism not being caught during a training period.

At block 207, when a payment mechanism is used, a communication with other nearby payment mechanisms and/or devices is triggered to create an ad hoc network. At block 209, the payment mechanism makes a determination whether a threshold number of items that a user would typically carry on his/her person along with the payment mechanism are not in communication with the payment mechanism, indicating a likely misuse of the payment mechanism. By way of example, a threshold can be specified as a number of usual neighboring items missing from the ad hoc network that would trigger deactivation and/or an identity challenge. The absence of one or more higher weighted objects from the network can result in a threshold being reached more quickly (e.g., by counting a higher weighted object as more than 1 object, and/or a lower weighted object as less than 1 object). If the threshold is reached, referring to block 211, the payment mechanism can deactivate itself and/or require an identity challenge before completing a payment transaction. If a threshold is not reached, referring to block 213, a payment transaction can be completed. Referring to block 215, when a payment mechanism is deactivated or an identity challenge is required, a fraud alert is automatically sent from the merchant processing the transaction to the user/account holder and/or to the financial institution of the payment mechanism.

Referring to block 217, a user/account holder receives a notification that a payment mechanism has been deactivated or an identity challenge is required, and, at block 219, the user/account holder can indicate to the financial institution that the payment mechanism is in his/her possession, and that it is not a fraudulent transaction. In addition, in accordance with an embodiment, the user can override the deactivation using an appropriate mobile and/or computer software application configured to transmit an override instruction to the payment mechanism. In each case, the payment mechanism learns from a false or true positive and may adjust weights, thresholds and/or lists of usual neighboring items accordingly.

In an alternative embodiment, prior to deactivation and/or requiring an identity challenge, a notification of suspected fraud can be first sent to the user/account holder for approval. If approved by the user/account holder, a financial institution can allow a transaction to be processed. In another embodiment, instead of a payment mechanism deactivating itself upon an attempt to process a transaction, notice of a believed-to-be fraudulent transaction can be automatically sent to the financial institution from the merchant, and the financial institution can deactivate the payment mechanism or allow the transaction depending on the circumstances.

Figure 3:
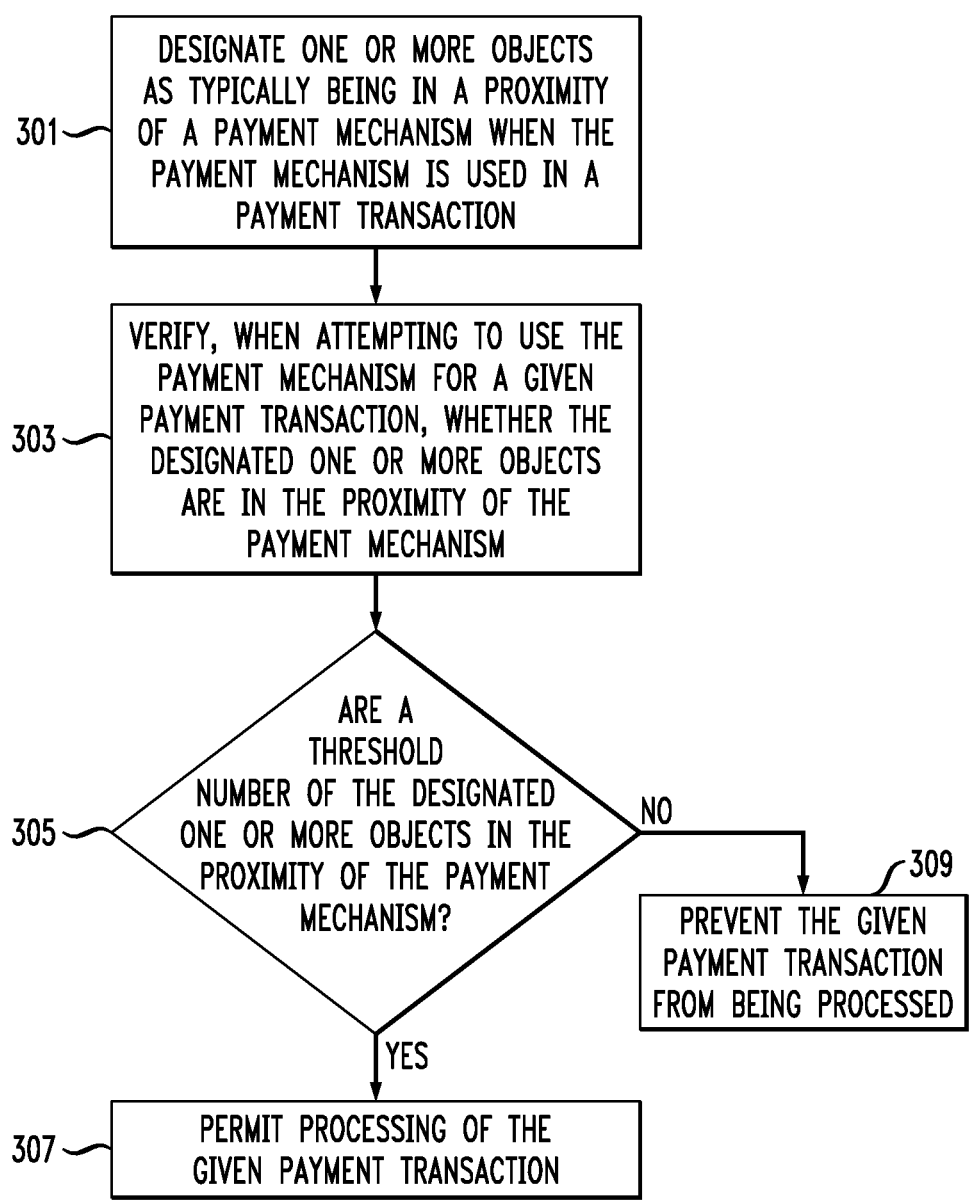
FIG. 3 is a flow diagram of a process for detecting fraudulent payment activity, according to an exemplary embodiment of the invention.

FIG. 3 is a flow diagram of a process for detecting fraudulent payment activity, according to an exemplary embodiment of the invention. Referring to FIG. 3, the process 300 includes, at block 301, designating one or more objects as typically being in a proximity of a payment mechanism when the payment mechanism is used in a payment transaction.

As used herein, an object in a proximity of a payment mechanism can refer to within a range of the payment mechanism so as to be considered being in the current physical possession of the user/account holder along with payment mechanism. According to an example embodiment, an object in a proximity of a payment mechanism is close enough to automatically establish wireless communication with the payment mechanism so as to create an ad hoc network including the payment mechanism and the object. According to an embodiment, the communication is based on relatively close range communication capabilities, such as, for example, BLUETOOTH and/or NFC capabilities. However, the embodiments of the present invention are not necessarily limited to BLUETOOTH and/or NFC protocols, and can include other protocols, such as, for example, IEEE 802.11, RFID and WiFi protocols.

The process 300 further includes, at block 303, verifying, when attempting to use the payment mechanism for a given payment transaction, whether the designated one or more objects are in the proximity of the payment mechanism. According to an embodiment, the verifying is based on an electronic communication from at least one of the payment mechanism and the designated one or more objects. For example, the verifying comprises determining whether the payment mechanism forms an ad hoc network with the designated one or more objects. Alternatively, the payment mechanism and/or the one or more objects can communicate via a network, including but not limited to, a local area network (LAN), wide area network (WAN), cellular network, satellite network or the Internet, with a verification server that receives location information (e.g., a GPS location, a cellular location or some other automatic location information) of the payment mechanism and/or of the one or more objects, and the verification server makes a determination whether the one or more objects are in the proximity of the payment mechanism.

The process 300 also includes, at block 305, establishing whether a threshold number of the designated one or more objects are in the proximity of the payment mechanism, permitting processing the given payment transaction if the threshold number of the designated one or more objects are in the proximity of the payment mechanism at block 307, and preventing the given payment transaction if less than the threshold number of the designated one or more objects are in the proximity of the payment mechanism at block 309. According to an embodiment of the present invention, establishing whether a threshold number of the designated one or more objects are in the proximity of the payment mechanism includes establishing whether a threshold number of the designated one or more objects forms the ad hoc network with the payment mechanism.

In accordance with an embodiment of the present invention, designating the one or more objects as typically being in the proximity of the payment mechanism comprises learning by the payment mechanism the one or more objects that are typically in the proximity of the payment mechanism when the payment mechanism is used in a payment transaction. The payment mechanism may associate a time period and/or a location with the designated one or more objects.

In accordance with an embodiment of the present invention, designating the one or more objects as typically being in the proximity of the payment mechanism comprises specifying by a user the one or more objects that are typically in the proximity of a payment mechanism when the payment mechanism is used in a payment transaction.

The payment mechanism can comprise, for example, a payment card or a mobile device (e.g., smart phone or smart wearable device) capable of automatically establishing wireless communication with the designated one or more objects. The designated one or more objects can comprise another payment card and/or a mobile device capable of automatically establishing wireless communication with the payment mechanism. As discussed in further detail herein, the payment mechanism itself can determine whether the payment mechanism is in the proximity of the designated one or more objects, and can establish that more or less than a threshold number of the designated one or more objects are in the proximity of the payment mechanism. For example, the payment mechanism itself can determine whether the payment mechanism forms an ad hoc network with the designated one or more objects, and can establish that more or less than a threshold number of the designated one or more objects forms the ad hoc network with the payment mechanism.

Preventing the given payment from being processed can include deactivating the payment mechanism, wherein the deactivating is performed by the payment mechanism itself, or by a financial institution or other controlling entity of the payment mechanism. According to an embodiment, after initially preventing a given payment transaction from being processed if less than the threshold number of the designated one or more objects are in the proximity of the payment mechanism, an identity verification by a user attempting to process the given payment transaction can be required, by, for example, electronically signaling at a merchant credit card or vending machine an identity verification requirement. Processing of a given payment transaction can be permitted upon the user successfully completing the identity verification.

The process may further comprise weighting at least one of the designated one or more objects higher than another one of the designated one or more objects in connection with establishing whether the threshold number of the designated one or more objects are in the proximity of the payment mechanism.

Figure 4:
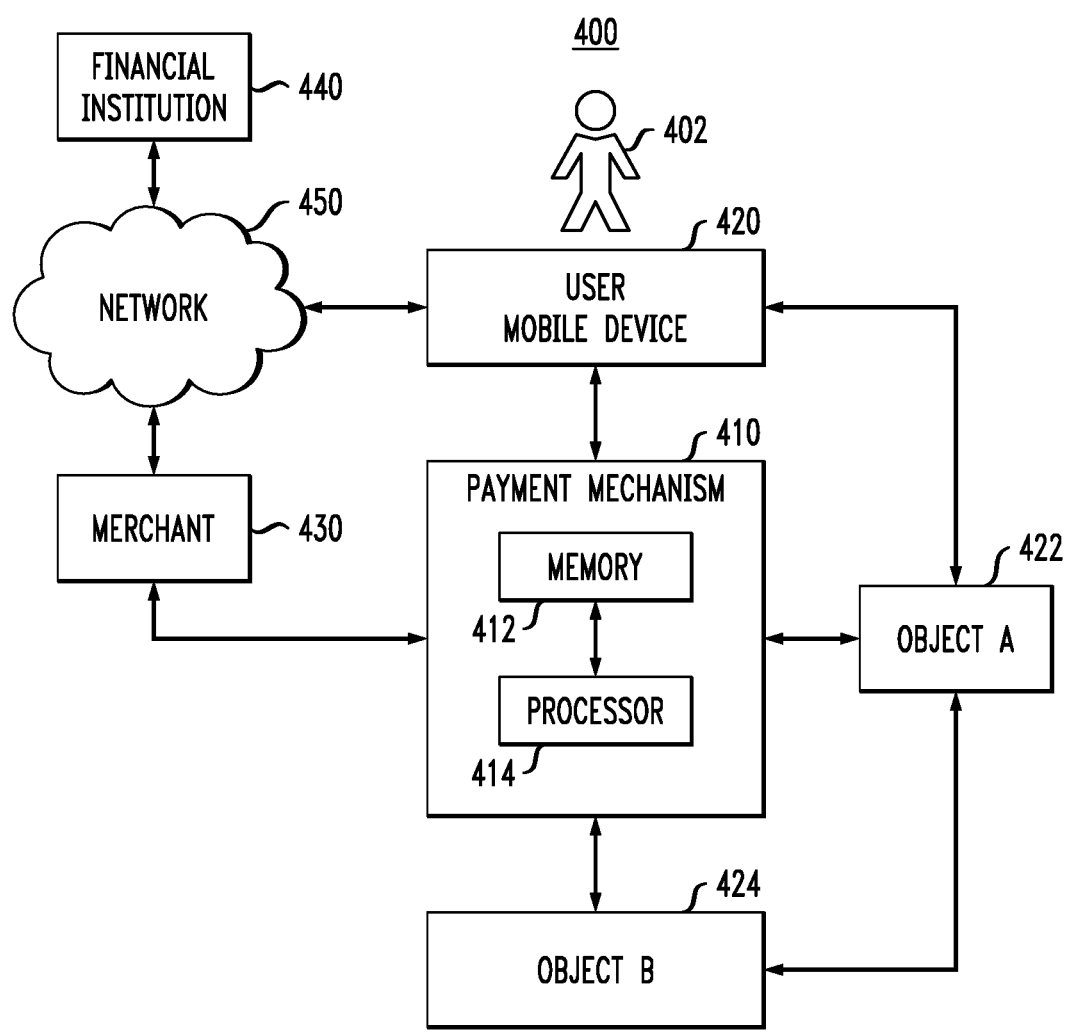
FIG. 4 is a block diagram of a system for detecting fraudulent payment activity, according to an exemplary embodiment of the present invention.

FIG. 4 is a block diagram of a system for detecting fraudulent payment activity, according to an exemplary embodiment of the present invention. As shown in FIG. 4 by lines and/or arrows, the components of the system 400 are operatively coupled to each other via, for example, physical connections, such as wired and/or direct electrical contact connections, and wireless connections, such as, for example, WiFi, BLUETOOTH, IEEE 802.11, and/or networks, including but not limited to, a local area network (LAN), wide area network (WAN), cellular network, ad hoc networks, WANET, satellite network or the Internet.

Referring to FIG. 4, the system 400 includes a payment mechanism 410 comprising a memory 412 and at least one processor 414 coupled to the memory 412, wherein the at least one processor 414 is configured to designate one or more objects (e.g., a user's mobile device 420, and objects A and B 422, 424) as typically being in a proximity of the payment mechanism 410 when the payment mechanism 410 is used in a payment transaction. The processor 414 is configured to verify, when attempting to use the payment mechanism 410 for a given payment transaction, whether the designated one or more objects (e.g., a user's mobile device 420, and objects A and B 422, 424) are in the proximity of the payment mechanism 410. The verifying may comprise determining whether the payment mechanism 410 forms an ad hoc network with the designated one or more objects. The processor 414 is further configured to establish whether a threshold number of the designated one or more objects forms the ad hoc network with the payment mechanism 410, permit the given payment transaction to be processed if the threshold number of the designated one or more objects forms the ad hoc network with the payment mechanism 410, and prevent the given payment transaction from being processed if less than the threshold number of the designated one or more objects forms the ad hoc network with the payment mechanism 410.

In accordance with an embodiment of the present invention, the processor 414 is configured to learn the one or more objects that are typically in the proximity of the payment mechanism 410 when the payment mechanism is used in a payment transaction, and associate at a time period and/or a location with the designated one or more objects.

The payment mechanism 410 can comprise, for example, a payment card or a mobile device (e.g., smart phone or smart wearable device) capable of automatically establishing wireless communication with the designated one or more objects. The designated one or more objects 420, 422, 424 can comprise, for example, mobile device and/or other payment cards capable of automatically establishing wireless communication with the payment mechanism 410.

In connection with preventing a given payment transaction from being processed, the processor 414 can be configured to deactivate the payment mechanism 410. In addition, after preventing a given payment transaction from being processed if less than the threshold number of the designated one or more objects forms the ad hoc network with the payment mechanism 410, the processor 414 can be configured to require an identity verification by a user/account holder 402 attempting to process the given payment transaction, and to permit the given payment transaction to be processed upon the user/account holder 402 successfully completing the identity verification.

The processor 414 can be further configured to weight at least one of the designated one or more objects higher than another one of the designated one or more objects in connection with establishing whether the threshold number of the designated one or more objects forms the ad hoc network with the payment mechanism 414.

As noted herein, a user/account holder 402 can register with a financial institution 440 or some controlling entity for the payment mechanism 410, a way to notify the user/account holder 402 in the event that a payment mechanism 410 is misused or suspected of misuse. The ways to notify can include, for example, a cell phone number, email address or other appropriate means to contact a user, for example, via the user's mobile device 420.

According to an embodiment, a user/account holder 402 can specify certain items (e.g., the user's mobile device 420, and objects A and B 422, 424) as the typical neighbors of the payment mechanism 410 that would form an ad hoc network in connection with processing a payment transaction. According to an embodiment of the present invention, user-specified neighboring items and/or weights can be sent from, for example, the user's mobile device 420, or other device of the user connected to the network 450, to the financial institution 440, and loaded onto the payment mechanism 410 by the financial institution 440 prior to the user receiving the payment mechanism 410. Alternatively, user-specified neighboring items and/or weights can be loaded onto the payment mechanism 410 by the user/account holder 402 using an appropriate mobile and/or computer software application configured to transmit such information from, for example, the user's mobile device 420 to the payment mechanism 410. The network 450 can include, but is not limited to, a LAN, WAN, cellular network, satellite network or the Internet.

As explained herein, when a payment mechanism 410 is deactivated or an identity challenge is required, a fraud alert can be automatically sent from a merchant 430 processing a payment transaction to the user/account holder 402 and/or to the financial institution 440 of the payment mechanism 410. The fraud alert from the merchant 430 can be sent via network 450. The user/account holder 402 can receive a notification that the payment mechanism 410 has been deactivated or an identity challenge is required, and, if applicable, the user/account holder 402 can respond to the identity challenge, and/or indicate to the financial institution 440 via the network 450 that the payment mechanism 410 is in his/her possession, and that the payment is not a fraudulent transaction. In addition, in accordance with an embodiment, the user/account holder 402 can override the deactivation using an appropriate mobile and/or computer software application configured to transmit an override instruction to the payment mechanism 410 from, for example, the user's mobile device 420.

In an alternative embodiment, prior to deactivation and/or requiring an identity challenge, a notification of suspected fraud can first be sent via network 450 from the financial institution 440 to, for example, a mobile device 420 of the user/account holder 402 for approval. If approved by the user/account holder 402, a financial institution 440 can contact a merchant 430 via network 450 to allow a transaction to be processed. In another embodiment, instead of a payment mechanism 410 deactivating itself upon an attempt to process a transaction, notice of a believed-to-be fraudulent transaction can be automatically sent via network 450 to the financial institution 440 from the merchant 430, and the financial institution 440 can deactivate the payment mechanism 410 or allow the transaction depending on the circumstances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
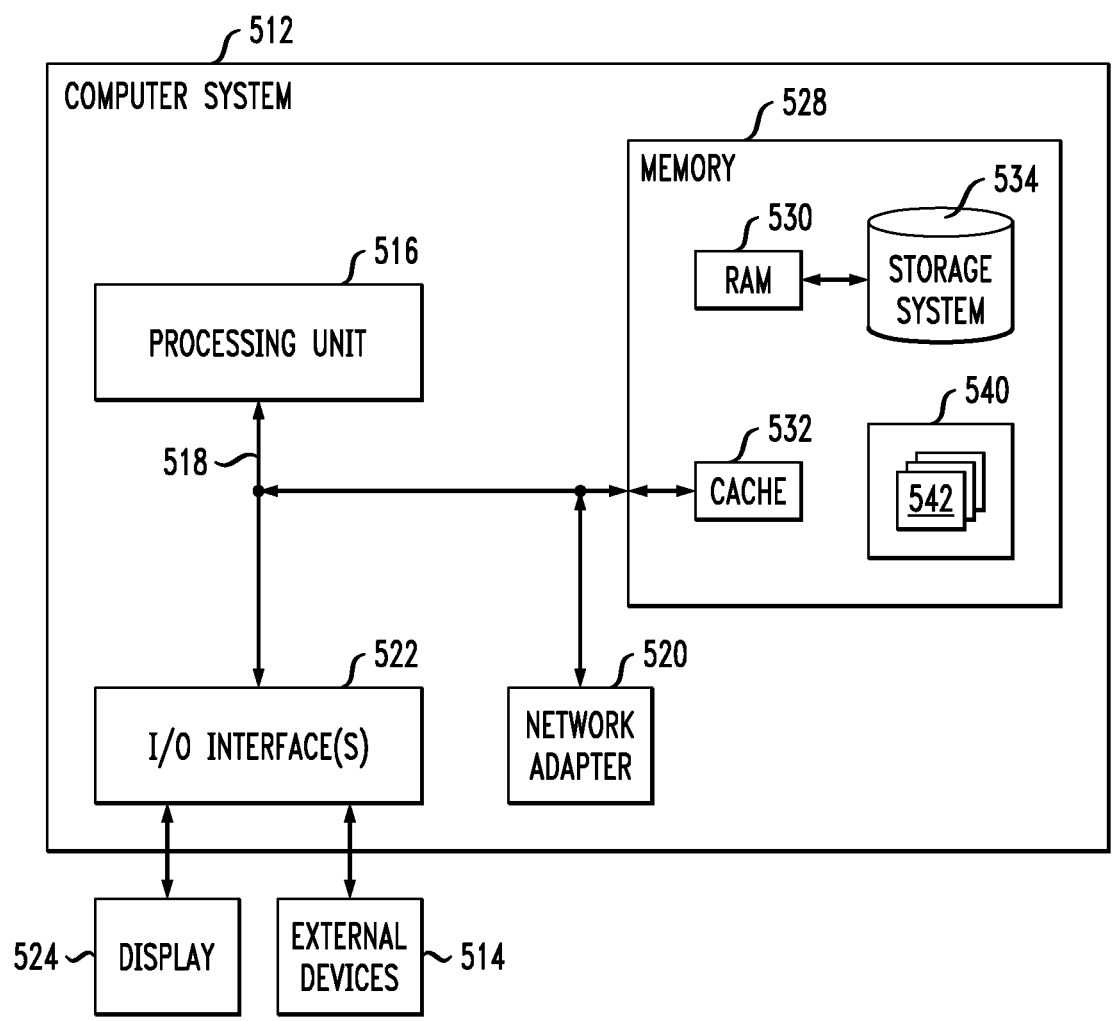
FIG. 5 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for detecting fraudulent payment activity, comprising:

designating one or more objects as typically being in a proximity of a payment mechanism when the payment mechanism is used in a payment transaction;

wherein the payment mechanism comprises a payment card including a processor, a memory operatively coupled to the processor, a power source, and transmission and reception hardware capable of close range wireless communication with the designated one or more objects;

verifying, by the payment mechanism, when attempting to use the payment mechanism for a given payment transaction, whether the designated one or more objects are in the proximity of the payment mechanism based on whether the payment mechanism and the designated one or more objects are part of a decentralized wireless network, wherein the verifying comprises:

determining whether the payment mechanism is in close range wireless communication with the designated one or more objects over the decentralized wireless network; and identifying a number of the designated one or more objects in close range wireless communication with the payment mechanism over the decentralized wireless network;

establishing, by the payment mechanism, whether a threshold number of the designated one or more objects are in the proximity of the payment mechanism based on the identified number;

permitting, by the payment mechanism, processing of the given payment transaction if the threshold number of the designated one or more objects are in the proximity of the payment mechanism;

preventing, by the payment mechanism, processing of the given payment transaction if less than the threshold number of the designated one or more objects are in the proximity of the payment mechanism;

recognizing, by the payment mechanism, a time period when and a location at which at least one of the designated one or more objects is typically out of the proximity of the payment mechanism;

wherein the recognizing comprises learning, by the payment mechanism, a grouping of the payment mechanism and less than a total number of the designated one or more objects that are typically in proximity to each other when the payment mechanism is used for payment at the location and during the time period; and permitting, by the payment mechanism, processing of the given payment transaction if the at least one of the designated one or more objects is out of the proximity of the payment mechanism, and if the payment transaction is occurring (i) at the location; and (ii) during the time period.

2. The method according to claim 1, wherein designating the one or more objects as typically being in the proximity of the payment mechanism comprises specifying by a user the one or more objects that are typically in the proximity of a payment mechanism when the payment mechanism is used in a payment transaction.

3. The method according to claim 1, wherein the payment mechanism is capable of automatically establishing the close range wireless communication with the designated one or more objects over the decentralized wireless network.

4. The method according to claim 1, wherein the designated one or more objects comprise another payment card and a mobile device capable of automatically establishing close range wireless communication with the payment mechanism.

5. The method according to claim 1, wherein the payment mechanism, via the processor, determines whether the payment mechanism is part of an ad hoc network with the designated one or more objects.

6. The method according to claim 1, wherein preventing processing of the given payment transaction comprises:
the payment mechanism establishing that less than the threshold number of the designated one or more objects are in the proximity of the payment mechanism; and
deactivating the payment mechanism.

7. The method according to claim 1, wherein, after preventing processing of the given payment transaction if less than the threshold number of the designated one or more objects are in the proximity of the payment mechanism, the method further comprises:
requiring an identity verification by a user attempting to process the given payment transaction; and
permitting processing of the given payment transaction upon the user successfully completing the identity verification.

8. The method according to claim 1, further comprising weighting at least one of the designated one or more objects higher than another one of the designated one or more objects in connection with establishing whether the threshold number of the designated one or more objects are in the proximity of the payment mechanism.

9. A system for detecting fraudulent payment activity, comprising:
a payment mechanism comprising a payment card including a memory and at least one processor coupled to the memory, wherein the at least one processor of the payment mechanism is configured to:
designate one or more objects as typically being in a proximity of a payment mechanism when the payment mechanism is used in a payment transaction;
wherein the payment card further includes a power source, and transmission and reception hardware capable of close range wireless communication with the designated one or more objects;
verify, when attempting to use the payment mechanism for a given payment transaction, whether the designated one or more objects are in the proximity of the payment mechanism based on whether the payment mechanism and the designated one or more objects are part of a decentralized wireless network, wherein in verifying, the at least one processor is further configured to:
determine whether the payment mechanism is in close range wireless communication with the designated one or more objects over the decentralized wireless network; and
identify a number of the designated one or more objects in close range wireless communication with the payment mechanism over the decentralized wireless network;
establish whether a threshold number of the designated one or more objects are in the proximity of the payment mechanism based on the identified number;
permit the given payment transaction to be processed if the threshold number of the designated one or more objects are in the proximity of the payment mechanism;
prevent the given payment transaction from being processed if less than the threshold number of the designated one or more objects are in the proximity of the payment mechanism;
recognize a time period when and a location at which at least one of the designated one or more objects is typically out of the proximity of the payment mechanism;
wherein, in recognizing, the at least one processor is further configured to learn a grouping of the payment mechanism and less than a total number of the designated one or more objects that are typically in proximity to each other when the payment mechanism is used for payment at the location and during the time period; and
permit the given payment transaction to be processed if the at least one of the designated one or more objects is out of the proximity of the payment mechanism, and if the payment transaction is occurring (i) at the location; and (ii) during the time period.

10. The system according to claim 9, wherein the payment mechanism is capable of automatically establishing the close range wireless communication with the designated one or more objects over the decentralized wireless network.

11. The system according to claim 9, wherein the designated one or more objects comprise another payment card and a mobile device capable of automatically establishing close range wireless communication with the payment mechanism.

12. The system according to claim 9, wherein in preventing the given payment transaction from being processed, the at least one processor is configured to deactivate the payment mechanism.

13. The system according to claim 9, wherein, after preventing the given payment transaction from being processed if less than the threshold number of the designated one or more objects are in the proximity of the payment mechanism, the at least one processor is configured to:

require an identity verification by a user attempting to process the given payment transaction; and permit the given payment transaction to be processed upon the user successfully completing the identity verification.

14. The system according to claim 9, wherein the at least one processor is configured to weight at least one of the designated one or more objects higher than another one of the designated one or more objects in connection with establishing whether the threshold number of the designated one or more objects are in the proximity of with the payment mechanism.

15. A computer program product for detecting fraudulent payment activity, the computer program product comprising a computer readable storage medium having program instructions embodied therewith, the program instructions executable by a processor to cause the processor to perform a method comprising:

designating one or more objects as typically being in a proximity of a payment mechanism when the payment mechanism is used in a payment transaction;

wherein the payment mechanism comprises a payment card including the processor, a memory operatively coupled to the processor, a power source, and transmission and reception hardware capable of close range wireless communication with the designated one or more objects;

verifying, by the payment mechanism, when attempting to use the payment mechanism for a given payment transaction, whether the one or more objects are in the proximity of the payment mechanism based on whether the payment mechanism and the designated one or more objects are part of a decentralized wireless network, wherein the verifying comprises:

determining whether the payment mechanism is in close range wireless communication with the designated one or more objects over the decentralized wireless network; and identifying a number of the designated one or more objects in close range wireless communication with the payment mechanism over the decentralized wireless network;

establishing, by the payment mechanism, whether a threshold number of the designated one or more objects are in the proximity of the payment mechanism based on the identified number;

permitting, by the payment mechanism, processing of the given payment transaction if the threshold number of the one or more objects are in the proximity of the payment mechanism;

preventing, by the payment mechanism, the given payment transaction if less than the threshold number of the one or more objects are in the proximity of the payment mechanism;

recognizing, by the payment mechanism, a time period when and a location at which at least one of the designated one or more objects is typically out of the proximity of the payment mechanism;

wherein the recognizing comprises learning, by the payment mechanism, a grouping of the payment mechanism and less than a total number of the designated one or more objects that are typically in proximity to each other when the payment mechanism is used for payment at the location and during the time period; and permitting, by the payment mechanism, processing of the given payment transaction if the at least one of the designated one or more objects is out of the proximity of the payment mechanism, and if the payment transaction is occurring (i) at the location; and (ii) during the time period.

16. The method according to claim 1, further comprising limiting, by the payment mechanism, generation of fraudulent use alerts during a period of the learning.

17. The method according to claim 1, further comprising limiting, by the payment mechanism, deactivations of the payment mechanism during a period of the learning.

18. The system according to claim 9, wherein the at least one processor is further configured to limit generation of fraudulent use alerts during a period of the learning.

19. The system according to claim 9, wherein the at least one processor is further configured to limit deactivations of the payment mechanism during a period of the learning.

20. The computer program product according to claim 15, wherein the program instructions further cause the processor to perform an additional step of limiting, by the payment mechanism, deactivations of the payment mechanism during a period of the learning.

* * * * *